United States Patent [19]

Paluck

[11] 4,031,629

[45] June 28, 1977

[54] APPARATUS FOR ESTABLISHING A LEVEL PLANE

[76] Inventor: George Paluck, 2156 W. Cuyler Ave., Chicago, Ill. 60618

[22] Filed: Mar. 30, 1976

[21] Appl. No.: 672,035

[52] U.S. Cl. .................................. 33/290; 33/299; 248/16; 356/172
[51] Int. Cl.² ................... G01C 5/00; G01B 11/26
[58] Field of Search ............ 33/299, 227, 290, 291, 33/292; 356/172; 248/14, 16

[56] References Cited

UNITED STATES PATENTS

| 3,588,249 | 6/1971 | Studebaker | 356/172 |
| 3,588,255 | 6/1971 | Alexander | 356/172 |

Primary Examiner—Steven L. Stephan

[57] ABSTRACT

A novel apparatus for establishing a reference plane or a line comprising a laser beam with means for rotating the beam to establish a plane and including a bracket mechanism which can be attached to the ceiling or a wall so as to support the laser mechanism so that it can be adjusted in a number of directions to allow its height, and its angular relationship to be set to any desired values.

8 Claims, 7 Drawing Figures

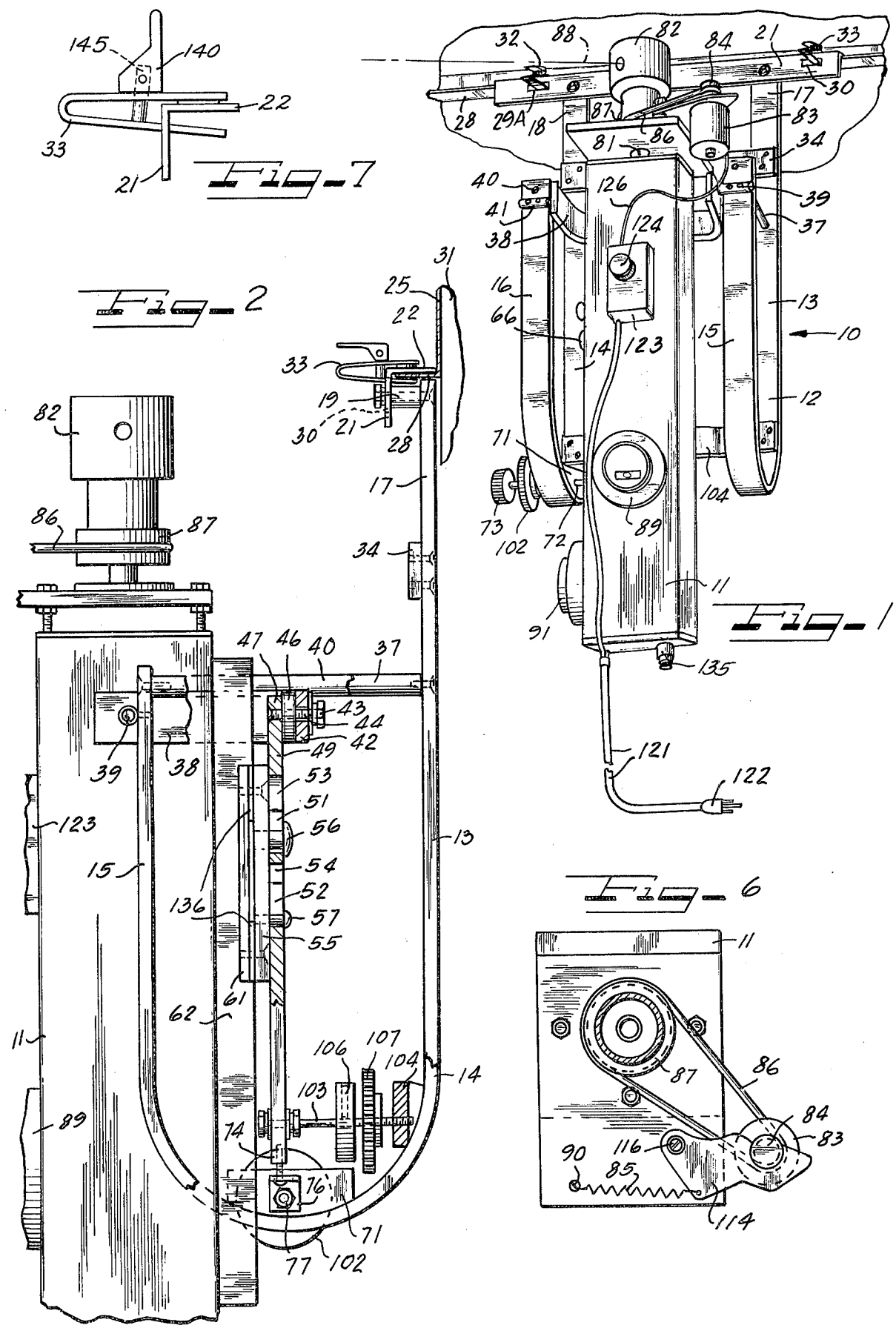

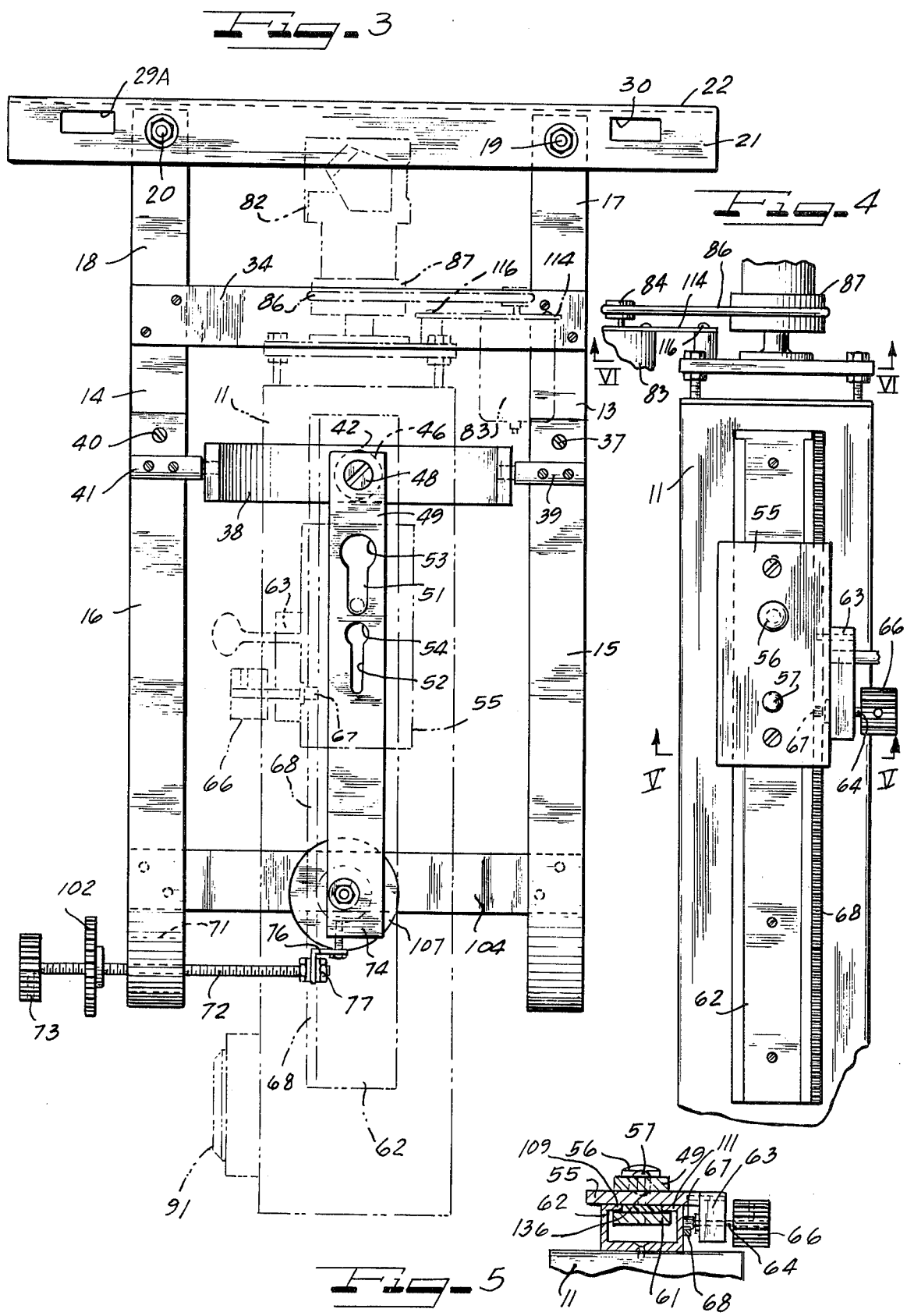

APPARATUS FOR ESTABLISHING A LEVEL PLANE

BACKGROUND OF THE INVENTION

1. Field of the Invention

This invention relates in general to apparatus for establishing a level plane and in particular to a novel bracket and laser arrangement for providing a reference plane.

2. Description of the Prior Art

There are two methods of utilizing lasers for installing ceilings in the construction industry and the first of these methods is to mount the laser on a tripod. However, such tripods will normally extend only to a height of about 14½ feet and, thus, for heights above this level the tripod is of no value. Also, the tripod is not easily portable and must generally be brought to a construction site with a truck. The second method for utilizing a laser is used when the ceiling height is higher than 14½ feet and comprises the use of a column clamp which clamps to the vertical side wall and thus if there is no column this apparatus and method cannot be used. Also, such prior column clamp art systems do have rack and pinion vertical adjustments which means that it is very hard to set the laser to the correct height which is very time consuming and expensive.

SUMMARY OF THE INVENTION

The present invention comprises a novel apparatus for establishing a level plane and comprises a laser and rotating mechanism for the laser in combination with a bracket means that is attached to a wall molding by adjustable clamps and which has a laser holding means comprising a holding bracket with pins which extend from a rack and pinion bracket attached to the rear of the laser. A pair of leveling vials are mounted on surfaces at right angles to each other of the laser case and means are provided for moving the laser case relative to the bracket in two directions so as to assure that the laser is held in a proper orientation. A rack and pinion is also provided for allowing vertical adjustment of the laser housing.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a view illustrating the laser and housing attached to the holding bracket with the holding bracket attached to the ceiling;

FIG. 2 is a side view partially cut away;

FIG. 3 is a front view of the bracket with the laser housing removed;

FIG. 4 is a back view of the laser housing illustrating the rack and pinion arrangement;

FIG. 5 is a sectional view taken on line V—V from FIG. 4 illustrates the details of the rack and pinion; and FIG. 6 is a view taken on sectional line VI—VI from FIG. 4.

FIG. 7 is a view of an adjustable clamp in open position.

DESCRIPTION OF THE PREFERRED EMBODIMENTS

FIG. 1 illustrates the laser leveling device of the invention 10 which comprises a laser housing 11 which includes a laser that projects a beam 81 in the vertical direction as mounted in FIG. 1 to a prism 82 mounted on top of the housing 11 which is driven by a motor 83 which has an output pulley 84 that drives a belt 86 which is mounted on a pulley 87 connected to the shaft which drives the prism 82. The beam 88 of the laser projects in the horizontal plane relative to FIG. 1 and as the prism 82 rotates a line will appear on a vertical surface in which the device is mounted so as to establish a reference plane from which workmen can determine ceiling heights or other purposes.

A pair of levels 89 and 91 are mounted to the housing 11 on surfaces at right angles to each other so as to allow the housing 11 to be adjusted to a vertical position.

The laser housing 11 is attached to and supported by a wall molding 28 which can be attached to a vertical wall by establishing a line on the wall at the height of the ceiling, as for example, 15 feet and then nailing the wall molding 28 to the wall on the line.

The laser holding and adjacent bracket 12 is then attached to the molding 28. The holding and adjusting bracket 12 has an upper angle iron cross member 21 which has a horizontal portion 22 that can rest on the horizontal extension 28 of the molding 28 as shown in FIG. 2. The vertical portion 29 of the molding 28 rests against the surface of the wall 31. A pair of adjustable clamps 32 and 33 extend through openings 29 and 30 formed in the member 21 in closed position with pressure on member 28 of wall molding as shown in FIG. 2.

Clamp 33 as shown in FIG. 7 is shown in the open position with pressure released and lever 140 in vertical position. This is the position of a clamp before it is set on to member 28 of the wall molding. Member 145 in FIG. 7 is a shaft attached to lever member 140. Standoffs 19 connect the horizontal member 21 to a pair of J-shaped main frame members 13 and 14 which have their upper ends 17 and 18 attached to the horizontal member 21 by the standoffs 19 as shown in FIG. 2.

A cross brace member 34 extends between the J-shaped frame members 13 and 14 near the upper ends as shown. A pair of braces 37 and 40 extend from the point portions 15 and 16, respectively, of the structural members 13 and 14 and the back portions so as to firmly attach the front portions 15 and 16 to the back portions so they do not move relative thereto.

A generally U-shaped member 38 is pivotally attached to the front legs 15 and 16 by pivot shafts 39 and 41.

The center portion 42 of the C-shaped member 38 pivotally supports the laser support frame member 49 by means of a pivot shaft 44, and bearing 46 which pivotally supports the upper end 47 from the portion 42 of the C-shaped member 38.

The lower end of member 49 can be adjusted in two planes relative to the bracket 12 by lead screw adjusting means including a first adjusting knob 73 which is mounted on a threaded shaft 72 which passes through a threaded bracket 71 mounted to the frame member 16 and which carries a bracket 77 that has a portion 76 which connects to the end 74 of the member 49 to move it transversely of the frame members 13 and 14. A lock nut 102 can be turned against the bracket 71 so as to lock the shaft 72 in a fixed position after the proper transverse adjustment has been established.

A front to back adjusting shaft 103 has one end connected to the lower end 74 of the member 49 and its other end threadedly mounted in a bracket 104 connected to a horizontal member 104 which extends between the frame members 13 and 14. A knob 106 can rotate the shaft 103 so as to move the end 74 forward and backwardly so that the member 49 will pivot about the shafts 39 and 41 and a lock nut 107 can be tightened so as to lock the shaft 103 in the adjusted position.

The member 49 is formed with a pair of key shaped openings 51 and 52 which have upper and lower large portions 53 and 54, respectively, into which shafts 56 and 57 with enlarged heads can be received. The pins 56 and 57 are attached to a plate 55. As best shown in FIG. 5, the member 55 has a bracket portion 63 through which a shaft 64 extends and a turn knob 66 is mounted on shaft 64. A pinion 67 is mounted on the end of shaft 64 and engages a rack 68 mounted on the side of a C-shaped channel 62 which has ends 109 and 111 that are slidably engaged an enlarged portion 61 of a member attached to the plate 55. Thus, by rotating the shaft 64 with the knob 66 the channel 62 can be caused to move in the vertical direction relative to the plate 55. The channel 62 is connected to the laser housing 11 and thus by rotating the knob 66 the laser housing 11 can be moved in the vertical direction relative to the plate 55.

As shown in FIG. 6, the motor 83 is pivotally mounted on a bracket 114 which is pivotally connected to the laser housing 11 by pivot pin 116 and a spring 85 extends from the bracket 114 to a pin 90 mounted on the laser housing 11 so as to spring bias the motor belt 86 away from the pulley 87 so that the prism 82 is continuously driven.

The laser used in this invention can be a type such as a model ML-650 laser available from Metrologic Instruments, Inc.

A power cord 121 has a plug 122 which can be connected to a suitable AC power source and supplies power to a motor speed control 123 which has an adjusting knob 124 for controlling the speed of the motor 83 and thus the rotational speed of the pentaprism 82. A power lead 126 extends from the motor control 123 to the motor 83.

In operation, the laser holding and adjusting bracket 12 is attached to the molding 28 by the clamps 32 and 33. The laser housing 11 is detachably connectable to the member 49 by extending the bolts 56 and 57 through the openings 53 and 54 and down into the narrower portions of openings 51 and 52 to lock it to the holding and adjusting bracket. The lock nut 102 is loosened and the knob 73 is turned until the level vial 89 indicates that the laser housing 11 is leveled in a first direction about the pivot shaft 44. Then the lock nut 102 is tightened to lock the shaft 72 in the adjusted position. Then the lock nut 107 is released and the knob 106 turned until the shaft 103 adjusts the member 49 and laser housing until the level vial 91 indicates that the laser housing is level in the front to back directions.

The vertical adjustment of the laser beam is accomplished by rotating the knob 66 to turn the shaft 64 which causes the pinion 67 to move the rack and the laser housing 11 vertically relative to the bracket 12 to a desired position. The laser motor 83 can be rotating the pentaprism 82 while these adjustments are being accomplished. The speed of the laser motor can be set by the knob 124 which can vary the speed of the pentaprism 82 from maximum to off where it does not rotate at all. A fuse 135 can be mounted in the electrical circuit to the laser and motor so as to protect the apparatus.

It is seen that the invention provides a simple bracket that can be easily attached at any level to molding on a vertical wall and which allows a laser housing including a laser, a motor and a pentaprism to be detachably mounted such that it can be adjusted so the housing is in a vertical position and at a desired height so as to establish a horizontal projected laser beam onto the vertical walls of a room thus establishing a reference mark which can be used by workers for construction or other purposes. Also, it has been discovered that vinyl slide material 136 may be mounted between the member 55 and members 61 so as to facilitate smooth and easy sliding between the channel 62 and the member 55.

Although the invention has been described with respect to preferred embodiments it is not to be so limited as changes and modifications may be made which are within the full intended scope as defined by the appended claims.

I claim as my invention:

1. A laser holding and adjusting bracket for supporting a laser on a wall moulding at a desired orientation and height comprising, an angle member with one extension of the angle resting on and mating with a horizontal extension of the wall moulding, a pair of clamps releasably clamping said one extension to said horizontal extension, said angle member having its other extension thus held in a vertical orientation.

a main frame member attachable to said other extension.

a C-shaped member pivotally attached to said main frame member and pivotal about a first horizontal axis, a generally vertical laser supporting frame member pivotally attached to said C-shaped member on a second horizontal axis which is at right angles to said first horizontal axis, a means for adjusting said supporting frame about said first and second axis, a laser housing, an attachment member connected to said laser housing and adjustable attachment means connecting said attachment member to said generally vertical laser supporting frame member for vertical adjustment of said attachment member with respect to said supporting frame member.

2. A laser holding and adjusting bracket according to claim 1 including first means for locking said vertical laser supporting frame member relative to said C-shaped member, and a first indicating level vial mounted on said laser housing to indicate when said housing and said vertical laser supporting frame members are in a vertical position relative to said second horizontal axis.

3. A laser holding and adjusting bracket according to claim 2 including second means for locking said vertical laser supporting frame member relative to said main frame member and a second indicating level vial mounted on said laser housing to indicate when said housing and said vertical laser supporting frame member are in vertical position relative to said first horizontal axis.

4. A laser holding and adjusting bracket according to claim 3 wherein said attachment member is linearly adjustable relative to said attachment means by rack and pinion means.

5. A laser holding and adjusting bracket according to claim 4 wherein said first means for adjusting comprises a first threaded shaft extending parallel to said first horizontal axis with one end threadedly connected to said main frame and the other end connected to said vertical laser supporting frame member at a point away from its pivot point.

6. A laser holding and adjusting bracket according to claim 5 including means for rotating said first threaded shaft and first locking means for locking said first threaded shaft.

7. A laser holding and adjusting bracket according to claim 4 wherein said second means for adjusting comprises a second threaded shaft extending parallel to said second horizontal axis with one end threadedly connected to said main frame and the other end connected to said vertical laser supporting frame member.

8. A laser holding and adjusting bracket according to claim 7 including means for rotating said second threaded shaft and second locking means for locking said second threaded shaft.

* * * * *